(12) United States Patent
Wilson et al.

(10) Patent No.: US 12,354,062 B2
(45) Date of Patent: Jul. 8, 2025

(54) REGIONAL MANUFACTURE AND ASSEMBLY OF VEHICLE AND VEHICLE STRUCTURE

(71) Applicants: Rudy Wilson, Bloomfield Hills, MI (US); Martin Geoffrey O'Connor, South Chailey (GB)

(72) Inventors: Rudy Wilson, Bloomfield Hills, MI (US); Martin Geoffrey O'Connor, South Chailey (GB)

( * ) Notice: Subject to any disclaimer, the term of this patent is extended or adjusted under 35 U.S.C. 154(b) by 173 days.

(21) Appl. No.: 16/888,746

(22) Filed: May 31, 2020

(65) Prior Publication Data

US 2020/0320475 A1 Oct. 8, 2020

Related U.S. Application Data

(63) Continuation-in-part of application No. 15/418,862, filed on Jan. 30, 2017, now abandoned.

(Continued)

(51) Int. Cl.
  *G06Q 10/0875* (2023.01)
  *G05B 19/418* (2006.01)
  (Continued)

(52) U.S. Cl.
  CPC ... *G06Q 10/0875* (2013.01); *G05B 19/41805* (2013.01); *G06Q 10/06315* (2013.01);
  (Continued)

(58) Field of Classification Search
  CPC .. G06Q 10/083; G06Q 30/0635; G06Q 50/04; G06Q 10/0875; G06Q 10/06315;
  (Continued)

(56) References Cited

U.S. PATENT DOCUMENTS

| | | | | |
|---|---|---|---|---|
| 4,900,083 A | * | 2/1990 | Kumasaka | B62D 23/00 29/469 |
| 5,090,105 A | * | 2/1992 | DeRees | B62D 63/025 29/460 |

(Continued)

FOREIGN PATENT DOCUMENTS

JP 2002006924 A 1/2002

OTHER PUBLICATIONS

Greigory Mordue, Brandan Sweeney; The Commoditisation of Automotive Assembly: Canada as a Cautionary Tale: 2017; See Abstract; It is the result of standardized production processes and the automotive industry's ability to recruit top tier talent particularly in less developed countries: Pub. International Journal of automotive Technology and Management; US.

(Continued)

*Primary Examiner* — A. Hunter Wilder

(57) ABSTRACT

Aspects of regional vehicle assembly and distribution are disclosed. A system of regional vehicle assembly and distribution includes a regional site, an assembly point, and a distribution point. A method comprises aggregating confirmed vehicle orders from the distribution point arranging the manufacturing and assembling at regional sites of primary vehicle structures and exterior and interior components based on the type of the confirmed vehicle orders and arranging the delivery to the assembly point of the primary vehicle structures and exterior and interior components. The method further includes instructing the assembly point to assemble a vehicle associated with the confirmed vehicle order.

8 Claims, 9 Drawing Sheets

Related U.S. Application Data

(60) Provisional application No. 62/299,028, filed on Feb. 24, 2016.

(51) Int. Cl.
  *G06Q 10/0631* (2023.01)
  *G06Q 10/0833* (2023.01)
  *G06Q 10/0835* (2023.01)
  *G06Q 50/04* (2012.01)

(52) U.S. Cl.
  CPC ..... *G06Q 10/0833* (2013.01); *G06Q 10/0835* (2013.01); *G06Q 50/04* (2013.01)

(58) Field of Classification Search
  CPC ........... G06Q 10/0833; G06Q 10/0835; G06Q 10/063112; Y02P 90/30; Y02P 90/02; G05B 19/41805; B62D 65/18
  See application file for complete search history.

(56) References Cited

U.S. PATENT DOCUMENTS

| | | | | |
|---|---|---|---|---|
| 6,449,597 | B1* | 9/2002 | McGill | G06Q 40/00 705/35 |
| 6,493,920 | B1* | 12/2002 | Hill | B62D 25/06 29/430 |
| 2010/0223158 | A1* | 9/2010 | Brown | G06Q 10/04 705/26.1 |
| 2011/0282476 | A1* | 11/2011 | Hegemier | G06Q 30/0621 705/26.5 |
| 2015/0058052 | A1* | 2/2015 | Kohlhoff | G06Q 10/0631 705/29 |
| 2016/0252898 | A1* | 9/2016 | Sahadeo | G05B 19/4183 700/116 |

OTHER PUBLICATIONS

Apaulo Agusto Cauchick Miguel, Evandro Prieto: An analysis of transferring value-added activities within the context of modular design; 2010; See Abstract; "To develop products using modular strategy, activities inherent to production are redistributed based on a division of work among assemblers and their suppliers"; Pub. Inderscience on-line; US.

Micheal Lewis, Mickey Howard; Beyond products and services: Shifting value generation in the automotive supply chain; 2009; See Abstract; "It presents two cases from opposite ends of the automotive value chain (A vehicle fleet management service and machine tool manufacturer) as a mechanism for exploring the drivers towards and the underlying nature of the process of 'servitisation'"; Pub. Inderscience on-line; US.

Lance Ealey, Glen Mercer: The Showroom as Assembly Line; 1993; See Abstract; "But by this time, instead of the final assembly taking place in the factory, it will take place in the showroom or right in the driver's seat"; Pub. Emerald insight; UK.

Susan Helper, John Paul MacDuffie, Frits Pil, Mari Sako, Akira Takeishi, Max Warburton; Modularisation and outsourcing. The Future of Automotive Assembly Management of the Extended Enterprise; 2002; See p. 2 / Three Scenarios. Note No. 1—"Modularization of designs"; No. 2—"Outsourcing of modules" No. 3—"Commoditization" ; No. 4—"Globalization of production capacity" ;No. 5—"Contract assembly"; Pub. Research Gate; US.

Glen Parry and Andrew Graves; Build to Order; The Road to the 5-Day Car; 2008; See p. 51/Par. 2. "Similarly, first tier suppliers often faced high level of planning uncertainty caused by uncertainties . . . ": See p. 105/ Par. 2. In addition the current production . . . ; See p. 140/Par. 1. "However the concept of ModCar includes . . . "; See p. 152/Par. 2. "Use of novel coloring technologies for outer panels . . . " See p. 298/Par. 3 The new production system builds upon the concepts . . . Pub. School of Management, Uni. of Bath; Springer Verlag Publishing; UK.

D.H Parshuram, A. Rahimansa, N.Hiralal, S.Punjabi; Tata Nano; A Case in Cost Management; Logistics and Supply Chain Management; 2009; See Slide 10. "Parts Supply base, make CKD (Complete Knock Down) and send to 5 other plants in different parts of India".Pub. TATA; India.

Robert R. Inman, David J. A. Gonsalvez; A Cost Benefit Model For Post-Production Vehicle Testing; 1998; See Abstract. "This cost-benefit analysis allows us to determine if a post-production vehicle test program is worthwhile, and if so,it allows us to choose the best such program"; Pub. Springer.

Matthias Holweg; 3 Day Car—The Order Fulfillment Process in The Automotive Industry-Conclusions of the Current State Analysis; 2000; See p. 3/Par.7. "Order tagging or de-coupling points can be used however to cut down lead times and give greater reliability to order sequence"; Pub. Cardiff Business School; UK.

Matthias Holweg, Daniel T. Jones; The Challenge: Building Car to Order—Can Current Automotive Supply Systems Cope; Enable Demand Driver Production; See p. 13 / Par. 2. "Separate tactical allocation decisions from operational order scheduling, and enable daily scheduling processes, or direct order booking into the production sequence to ensure minimal OTD"; Pub. Cardiff Business School; UK.

David Taylor, David Brent; Manufacturing Operations and Supply Chain Management; 2001; See p. 171 / Par. 2. "The discussion describes one specific attempt to overcome demand amplification in a particular supply chain" See p. 223 / Par. 6. "Supply Chain management . . . The scope of SCM is explained through discussion of the SCM model shown in Figure 1"; Pub. Thomson Learning; UK.

Dr Sotiris Makris, Project manager; MyCar Project; 2006; See p. 3 / Par. 2. "The above discussion describes one specific attempt to overcome demand amplification in a particular supply chain"; See p. 4 / Par. 4. ; A variety of cases on demand amplification have been identified . . . such as the supply variability effect. The scope of supply chain management is explained through the supply chain management model in Figure 1; Pub. www.my-car project. eu; EU.

Anne Beamish; Learning from Work: Designing Organizations For Learning and Communication-Automobile Dealerships Past and Presentation; 2008; See p. 18 / Par.1. "New Cars would be shipped form the factory to factory stores and assembled with factory trains technicians . . . then drive the vehicle to the dealership where it would be sold"; Pub. Stamford Press; US.

Robert Genat; The American Car Dealership Report; 1999; See p. 9 / Par. 6. "During the first decade of the 20th century . . . each automobile was assembled from start to finish, one car at a time"; See p. 20 / Par. 2. "The centrally located branch dealer would often be the location where all new cars for the area were shipped"; Pub. Motorbooks; US.

The Automobile vol. 38: Farmer Chief Buyer in Twin Cities Territory; 1918; See p. 351 / Par. 6. "(last paragraph) Only two bodies are assembled . . . "; See p. 352 / Par. 2. "The factory (Flint) ships units (vehicles) in units"; Pub. Automotive Industries; US.

Arleana Sawyers; Early Dealers Did Final Assembly; 2011; See p. 1/Par. 1. "Retailer had 2 employees and his vehicles arrived partly assembled in railroad boxcars"; Pub. Automotive News; US.

Mark Vonderembse; Understanding the Automotive Supply Chain; 2017; See p. 11/Par 2. "OEM's have historically fabricated and manufactured auto bodies within or very near to their assembly plant facilities"; Pub. University of Toledo; US.

David R Cramer, David F Taggert; Design and Manufacture of an Affordable Advanced Composite Automotive Body Structure; 2002; See p. 9/Par 5. " . . . the body assembly sequence"; See Fig. 9. "ref from p. 9"; Pub. RMI US.

Sandberg Ake; Volvo Reflective Production System; Uddevalla Production System; 1995; See p. 9/Par. 4. " . . . alternative to line production"; See p. 12/Par. 6. "beyond assembly hours . . . quick delivery of precise (vehicle) specifications"; Pub. Munich Personal RePEc Archive; Sweden.

Luciano Ciravegna, Pietro Romano: Outsourcing practices in automotive supply networks: An exploratory study of full service vehicle suppliers; 2013; See Abstract. Most automotive companies outsource the design , manufacturing and assembly of some com-

(56) References Cited

OTHER PUBLICATIONS plete cars to independent suppliers of full service vehicle companies. (FSVs) Pub. Research Gate; UK.

Paul Nieuwenhuis, Eleni Katsifou; More sustainable automotive production through understanding decoupling points in leagile manufacturing; 2014; See p. 239/Fig. 4. Conventional vs Low Volume Car production. Fig. 4 shows the fundamental differences that assure the viability of low volumes of the specialty car sector; See p. 240/Par.1. Such a system could, for example, involve the mass production of core components and sub assemblies to be shared as virtual commodities by a range of smaller low investment assemblers; Pub. Elsevier; UK.

Desmond Doran; Rethinking the supply chain: an automotive perspective; 2004; See Abstract. This paper contends that the description of tiering within the automotive supply chain is likely to require redefining in light of the development of modular supply, and that a natural consequence of modular supply is the transfer of valued adding activity throughout the supply chain; Pub. Emerald Insight; UK.

Pioneer Budd Built All Steel Body; 1996; See p. 2/Par. 4. "In many cases, Budd produced all the (vehicle body) panels and the customer assembled them, using plant fixtures designed by Budd"; Pub. Automotive News; US.

Frits K Pil, Takahiro Fujimoto; Lean and Reflective Production: The Dynamic Nature of Production Models; 2006; See p. 5/Par. 4. "Volvo's reflective production model is characterized by parallel work flow (and in the case of Uddevalla, no line at all), the professionalization of workers, low levels of multi-functional automation, naturally grouped assembly work, ergonomically sound production tasks, and flexible production levels"; Pub. Industry Studies Association; US.

J B Naylor, Mohamed M Naim, Danny Berry: Leagility: Integrating the lean and agile manufacturing paradigms in the total supply chain; 1999; See p. 111/ Section 3.2.2. "Rapid Reconfiguration: Agile manufacturing means that the production process must be able to respond quickly to changes in information from the market : Section 3.1, and the ability, at short notice, to change to a wide variety of products [10]. Therefore, the ability to rapidly reconfigure the production process is essential"; Pub. Elsevier; UK.

Dennis R Towill, Martin Christopher; Don't Lean Too Far-Evidence From the First Decade; 2007; See p. 3 / Par. 9. "The De-Coupling Point. Fundamental to the marriage of the lean and agile principles in supply chain design is the idea of the 'de-coupling point'. Whilst the original concept of de-coupling related primarily to the material flow it is also important to recognize the related ideas of the information flow de-coupling point and the possibility of the need for a virtual decoupling point".Pub. International Journal of Agile systems and management; UK.

Edward Feitzinger, Hau L Lee; Mass Customization at Hewlett-Packard: 1997; See p. 2/ Par.4. Modular Product Design—The Power of Postponement; A modular product design has three benefits; See p. 5/Par.5; "Manufacturing and distribution must coordinate both the supply and the redesign of materials and situate manufacturing processes in the most efficient locations". Pub. Harvard Business School; US.

Rachel Mason-Jones, Ben Naylor, Denis R Towill; Agile Management Systems; Engineering the leagile supply chain; 2000; See Abstract. Whereas leanness may be achieved by eliminating non-value added time, agility usually requires the additional reduction of valued added time via production technology breakthroughs; Pub. Research Gate: UK.

Graeme P Maxton, John Wormald; Time for a Model Change; Re-engineering the Global Automotive Industry; 2004; See p. 3/Par.3. "The Fourth Revolution has to un-bundle and re-bundle the assets and division of labour within the automobile industry in order to facilitate more productive allocation and use of resources and capabilities" Pub. Cambridge University Press; UK.

Tom Murphy: Niche A Ride (Cunningham Motors); Suppliers as Assemblers—Ref Suppliers as Assemblers; 2002; See p. 7. Par. 1 2 3; "Suppliers and Assemblers" "Early next year. German's Wilhelm Karmann GmbH, a well known builder of niche vehicles will begin assembling the rear drive Crossfire"; Pub. Wards Auto; US.

Rich Parkin, Reid Wilk, Evan Hirsh, Akshay Singh; The future will be rocky for auto companies unable to improve returns on capital; 2017; See p. 11/Par.3. "By removing excess capacity and concentrating supply, these collaborative solutions offer some of the same benefits as industry consolidation . . . "; See p. 12/Par.3. "Improving the dealer model would be a plus for OEM's and a relief for customers, who by and large want a haggle-free, simple experience—and can't seem to find one" ; Pub. PWC; US.

Amit Tambi; The Curious Case of Cunningham Motors—A View from the Supply Chain Lens; 2009; See p. 2. "Overseeing the build of the car virtually, they would each personify the term "coordinator". From keeping a close tab on customer orders (including the individual preferences of some) and relaying the requirements to various suppliers, to coordinating the build and eventual dispatch of the cars, not to mention the after-sales service, would be, to say in mild terms, monumental"; Pub. Toolbox; US.

Robert Sherefkin; Cunningham Calls it Quits; 2002; See p. 2/Par.3 "Lutz's plan (Cunningham Motors) hinged on avoiding big investments in plants and equipment. It relied on suppliers to design, develop and assemble vehicle components into modules, which would be shipped to Roush Industries for final assembly" Pub. Automotive News; US.

Thaise Graziadio; Some evidence of technological changes associated to modular production and supply—The Modular Strategy; 2001; See p. 2 / Par. 2 In order to understand this situation we propose to investigate the relation of three core concepts: modularity in production, outsourcing of the modules and geographical proximity of some suppliers (that share the site with the assembler).; See p. 3 / Fig 1. ; Pub. Online.

Professors Michael H Moffett,Mark Griffiths and Steven M. Anderson; 1998; See p. 3 / Par. 5/6. "Co-Production vs. Joint Production Plant X was the realization of a not-really-that-new idea. GM would design the car, recruit and organize the suppliers, build and furnish the basic manufacturing floor, but have the suppliers manufacture their parts and inputs on-site and then assemble the car"; Pub. The American Graduate School of International Management; US.

Ford's System of Branch Assembly Plants; FordMotorHistory.com; See p. 2 / Par.2. Ford initially manufactured fully assembled cars in Detroit and then "knocked them down" (took off the wheels and otherwise prepared them for shipment) before shipping them to dealers around the country. The agents in distant cities reassembled the knocked-down cars before placing them in showrooms. US.

Richard W Everett; Disintermediation of the U.S Auto Industry; 2000; Stanford University; US. See p. 5/Par.3. "Distribution and marketing: The Franchised Dealership Channel.—Manufacturers distributed their products through a network of franchised dealers; See p. 20 / Par. 1." At e-GM, General Motors' e-commerce group was forging a new model of the dealership role that under this new model, the manufacturer and dealer would share much more of the customer relationship than they previously had.

Adrian Chernoff; GM Autonomy—Reinventing the Automobile; Date Unknown; See p. 1/Par.1. "The AUTOnomy showcases a revolutionary new electric platform where all the technology needed for the vehicle's operations is contained. This groundbreaking design provides the ability to offer an unlimited number of interchangeable vehicle bodies can be affixed to a single skateboard platform"; Pub. Adrian Chernoff; US.

Think Micro Factory; 2015; See p. 1/Par. 5. "In addition to unveiling its technology platform and prototype, Divergent Microfactories announced plans to democratize auto manufacturing. The goal is to put the platform in the hands of small entrepreneurial teams around the world, allowing them to set up their own microfactories and build their own cars and, eventually, other large complex structures. These microfactories will make innovation affordable while reducing the health and environmental impacts of traditional manufacturing"; Pub. Divergent; US.

Juergen Hoebarth; Micro Factories; Manufacturing in a More Sustainable way; 2012; Pub. Manufacturing Revolution; US; See p. 1/Par.2. The concept refers to a small-dimension factory that saves resources like space, energy, materials, and time.

(56) References Cited

OTHER PUBLICATIONS

Friedrich Kessler; Automotive Dealer Franchises: Vertical Integration by Contract; 1957; See p. 1135 / Par. 1 "Under the (Automobile) franchise system, distribution of the product is limited to chosen retailers in each community"; Pub. Yale Law School; US.
Pier Menenti, EMEA: IDC Manufacturing Insights;—The Assembly Line of the Future; MESA conference Düsseldorf; Journal; 2010; See Abstract; "The assembly line of the past built to economies of scale have rapidly given way to a modern assembly built for economies of scope where efficiencies are primarily with increasing scope of different types of product rather than vols. of the same product . . . "; Pub. IDC manufacturing Insights; Germany.
Paul Nieuwenhuiss and Peter Wells; The Automotive Industry and The Environment-Alternatives to High Volume Car production; 2003; See Section 9.1 "Alternative to high Volume car production" See Section 9.2 "Alternative Approaches to Production"; Pub. CRC Press; UK.
G. Murray; I Stream® Assembly Process; Pub. Website GM Design; UK; 2020; Par.3. The iStream® assembly process is a complete rethink and redesign of the traditional automotive manufacturing process and could potentially be the biggest revolution in high vol. manufacture since the Model T. T UK.
Christian Begggren; Dead Horse or a Car Dealers Dream?; 1993; See p. 135/Par. 3. "Parallel assembly at (Volvo) Uddevalla meant that cars were built in many places simultaneously"; See p. 138/Par.1. "Beginning in mid 1993, Uddevalla's market and delivery planners had advanced plans to integrate almost all of this traditional "dealer installations" in the factory process, and as a result be able to produce cars that could be delivered directly to customers"; Pub. Royal Inst of Technology; Stockholm.
G. Parry, J. Roehrich; An engineering systems approach to strategic change; See p. 10/Par.5. "To maximize efficiency of service a key aim is the removal of stock held by car dealers, the key service providers in the value chain."; See p. 13/Par. 2. Process—Future State—A shared strategic vision has to be maintained across the automotive enterprise:stocks must be avoided, order to delivery times reduced, queries answered rapidly and planning order data shared rapidly; Bristol Business School; UK.
Michael S. Wynn-Williams; Surfing the Global Tide: Automotive Giants and How to Survive Them; 2009; See p. 21. "The cost of selling an additional product (vehicle) through a shared distribution system might be less than a rival selling the same product through a dedicated distribution system"; Pub. Palgrave MacMillan; US.
Florian Klug; How electric car manufacturing transforms automotive supply chains; 2013; See p. 9. "Parallel manufacturing—This phenotype is based on the purpose design concept, which develops and constructs a radical new vehicle. A totally fragmented manufacturing system where assembly, painting and body shop is separated between e-cars and non e-cars is according to the low volume of non e-cars unlikely to be adaptable"; Pub. Research Gate; Germany.
Peter Wells; Micro Factory Retailing; 2001; See pp. 12 / Section 4.2. "Micro Factory Retailing Concept. However the concept of Microfactory Retailing (MFR) is to provide an alternative model, applicable to the established industrialized countries as well as the developing world"; See p. 14 / Par.1. "There would be no separate distribution channels or sales outlets: the factory is also the sales, maintenance, service and repair location" Pub. Ctr. for Automotive Research; UK.
Peter Wells; Sustainable Business Models and the Automotive Industry; 2013; See p. 234 / Par 1. "So, if it is possible to design a business model under which the market is served with local manufacturing-distribution units then there is a significant cost saving to be gained. Perhaps more important than the simple investment cost comparison are the many strategic possibilities which flow from MFR (Wells, 2001)"; Pub. MB Management; UK.
Paul Nieuwenhuis, Peter Wells; The All-Steel Body as a Cornerstone to the Foundations of the Mass Production Car Industry; 2007; See Abstract; "The usual primacy given to Henry Ford, the moving assembly line and the organization of labor is counter balanced by the focus on production technology"; Pub. Cardiff University—Cardiff Business School; UK.
Paul Nieuwenhuis, Peter Wells; Global Automotive Industry; Buddism in crisis; 2015; See p. 46 / Para 2. It is clear that the present structure of the industry and its dominant business model are so closely linked with the adoption of Budd all steel technology that a significant change will be possible only with the adoption of a different set of core technologies and an alternative business model by the auto industry; See p. 47 / Par 1 contd; Pub. Wiley UK.
Thomas Klier, James Rubenstein; Who Really Made Your Car?; 2008; See p. 18/Par.3. "What was once a highly vertically integrated industry has become ever more dependent . . . "; See p. 192/Par.3. The term 4PL (Fourth Party Logistics) has sometimes been applied to the coordination by a single logistics fir of all companies involved along the supply chain. "The definition of a 4PL is to manage 3PLs"; See p. 193/Figure 8. "Hierarchy of Supply Chain Management"; Pub. Federal Reserve Bank of Chicago; US.
James Rubenstein; The Changing U.S. Auto Industry: a Geographical Analysis; The Journal of Economic History; Branch Agencies to sell and service cars. 1992; See p. 50 / Par. 5. "First in the city in which it was located, the branch replaced a dealership as the place where customers went to buy a food automobile": See p. 5/ Par. 1 Contd; Pub. Routledge; US.
Joe Miemczyk, Matthias Holweg; Building Cars To Customer Order-What Does It mean For inbound Logistics; 2004; See p. 3/Par.3. "The lead-time reduction efforts will initially have to focus on the vehicle manufacturer . . . "; See p. 5/Par.7. Furthermore, third-party logistics (3 PL) companies we analyzed had taken a range of additional responsibilities including the management of local warehouses; Pub. Journal of Business Logistics. Oak Brook: 2004. vol. 25; US.
Sergio Marchionne; Confessions of A Capital Junkie; 2015; See p. 22. "Cross-Selling—Optimization of manufacturing investments and product allocation, leveraging commonalities in top-hat development"; Pub. Fiat Chrysler Automotive; US.
Gerald R. Bodish; State Ban on Direct Manufacturer Sakes to Car Buyers; 2009; See p. 4/Par.3. "Perhaps the most obvious benefit from direct manufacturer sales would be greater customer satisfaction, as auto producers better match production with consumer preferences ranging from basic attributes on standard models to meeting individual specifications for customized cars"; Pub. The Department of Justice; US.
Marina Lao, Debbie Feinstein, Francine Lafontaine; Direct-to-consumer auto sales: It's not just about Tesla; 2015; See p. 1/Par.2. "Our point: States should allow consumers to choose not only the cars they buy, but also how they buy them"; Pub. Federal Trade Commission; US.
Austin Weber; Outsourcing the Line; 2006; See p. 3/Par.3/4. As consumers continue clamoring for more distinctive models, automakers are under increasing pressure to develop new vehicles; See p. 3/Par. 5. "The decision to engineer and build a vehicle in-house or outsource it to a vehicle integrator is a complex process," says Baron; Pub. Assembly Magazine; US.
Susanne Hertz, J K Johansson, Flip De Jager; Customer-Oriented Cost Cutting: Process Management at Volvo; 1999; See p. 3/Abstract; "In the Volvo illustration a manufacturer's re-engineering of its distribution chain evolved into a complete recasting of its order fulfillment process"; Pub. Jonkoping University; Sweden.
Nestor Andres Arteaga Martin, Thomas Bar and Rainer Start; A Reference Framework For Manual Assembly Simulation; 2013; See Abstract; "This paper starts highlighting the importance of simulating manual assembly processes in the automotive industry"; Pub. Smart Production Eng; US.
Peter Fredriksson, Lars-Erik Gadde; Flexibility and Rigidity in Customization and Build-to-Order Production; Journal; 2005; See Abstract: "This paper deals with the efforts of firms to tailor their products to the needs of individual customers"; Pub. Science Direct; Sweden.
J.Pandremenos, J Paralikas, K Salonitis, G Chryssolouris; Modular Concepts for the Automotive Industry; 2009; See Abstract; "In the present paper the major evolutions of modularity concepts are reviewed in the case of the automotive industry"; Pub. Elsevier; UK.

(56) References Cited

OTHER PUBLICATIONS

Haroldo Lhou Hasegawa, Delvio Venanzi, Orlando Roque Da Silva; Modular Consortium (MC) and Industrial Condominium (IC) in Brazil's Automotive Industry; 2015; See Abstract: "This paper aims to analyze the concepts of Modular Consortium (MC) and Industrial Condominium (IC) by four auto makers located in Brazil"; Pub. Brazilian Journal of operations and management; Brazil.

Rich Parkin, Reid Wilk, Evan Hirsh, Akshay Singh; The Future Will be Rocky For Auto Companies Unable to Improve Returns on Capital; 2017; See p. 12/Par.1. "Although OEM's are locked into dealer relationships in the U.S. and Europe . . . they should begin to explore and lobby for efforts that will reduce their costs by using more efficient channels to reach car buyers"; Pub. PWC; US.

Adam Robinson ; The Rise of Distributed Manufacturing and 7 advantages over Traditional Manufacturing; 2014; See p. 3/Par. 1. "By manufacturing items closer to their end destination, we reduce logistics costs and environmental impact. This also reduces the time from production to sale"; Pub CERIS.com; US.

Joss Colchester; Distributed Manufacturing; 2020; See p. 32 / Par 2. "Distributed Manufacturing expands spectrum of production allowing for very small scale and production through information networks that aggregate and coordinate" ; See p. 35 / Par 1. "On demand production already carries the potential of dramatically reducing resource waste . . . "Pub. Complexity Labs Publication; UK.

Martin Luccarelli, Dominik Matt, P Russo Spena; Impact of Electro-mobility on Automotive Architectures; Journal; 2013; See p. 3/Section. 2.1. Optimizing the integration of new specific components— "Today a large share of vehicle components is integrated into families, called systems and modules . . . "; Pub. World Electric Journal; Spain.

Ray Chrisman; Enhancements of Distributed Manufacturing using Expanded Process Intensification Concept; 2010 See p. 2 / Par. 2. Distributed Manufacturing Definition. "For the Production of things like cars and planes. It means making parts all over the world and using supply chain management concepts to bring it all together for final production. Labor cost are a key"; Pub. Uni. of Washington; USA.

Horace Dediu; The Entrants Guide to the Automobile Industry; 2015; See p. 3 / Par.9. "Contract manufacturing is nearly nonexistant. Unlike other industries which modularized long before saturation, automobile manufacturing is largely inter-dependent. You can't buy your chassis from one maker, the body from another and fit the . . . "; Pub. Asymo; US.

* cited by examiner

250

| Operating Metrics 251 | Assembly Point 120 | Distribution Point 125 |
|---|---|---|
| Vehicle Distributions 252<br>Annually<br>Daily | -0- | 50,000 year<br>2/day<br>(250 working days) |
| Vehicle Assembly 254<br>Annually<br>Daily | 50,000/year<br>4/day<br>(250 working days) | -<br>- |
| Aggregate Number 256 | 50 | 50 |

*FIG. 2B*

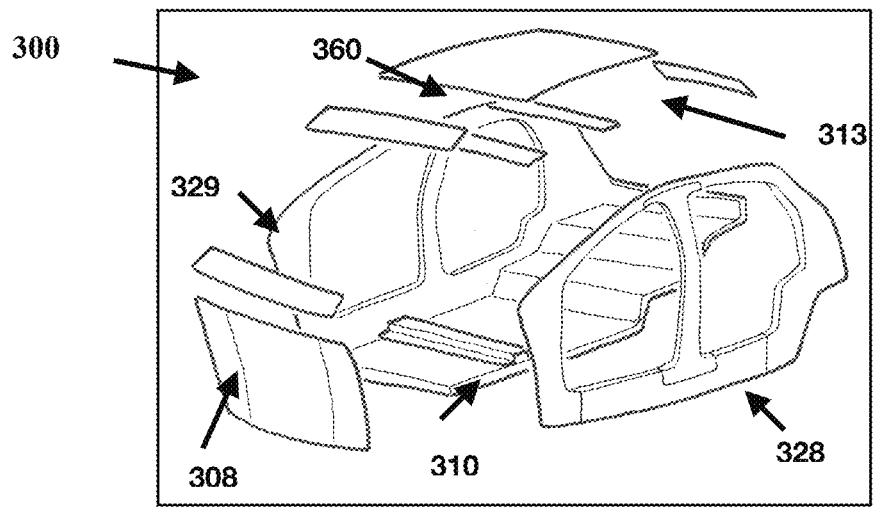

| COMPONENT LEVEL 301 | PART NUMBER 302 | Mfg. Type 303 | PROCESS DESG. 304 | QTY 305 |
|---|---|---|---|---|
| Front Bulkhead 308 | 300-308 | Assy. | A | 1.00 |
| Floor 310 | 300-310 | Assy. | B-1 | 1.00 |
|   Front Floor 311 | 300-311 | Part | B | 1.00 |
|   Rear Floor 312 | 300-312 | Part | B | 1.00 |
|   Cross Brace 330 | 300-330 | Part | B | 1.00 |
| Rear Valance 313 | 300-313 | Part | A | 1.00 |
| Side Panel (LH/RH) 328,329 | 300-328,329 | Assy. | A | 2.00 |
|   A Pillar RH/LH 320. 321 | 300-320,321 | Part | C | 2.00 |
|   B Pillar RH/LH 322. 323. | 300-322,323 | Part | C | 2.00 |
|   C Pillar RH/LH 324. 325. | 300-324,325 | Part | C | 2.00 |
|   C Pillar Inner 326,327 | 300-326,327 | Part | C | 2.00 |
|   Side Sills (RH,LH) 340,341 | 300-340,341 | Part | C-1 | 2.00 |
| Roof 360 | 300-360 | Assy. | D | 1.00 |
|   Side Cant Rails RH/LH 342,343 | 300-342,343 | Part | C-1 | 1.00 |
|   Roof Cant Rails 350,351 | 300-350,351 | Part | C-1 | 1.00 |
| Joining Materials 370 (not shown) | 300-370 | Fast. | E | 1.00 |

*Fig 3B*

| COMPONENT LEVEL 405 | COMPONENT DESCRIPTION 408 |
| --- | --- |
| Primary Cell 300 | Primary Vehicle Structure Primary Cell |
| Painted Closures Panels 480 | Doors, hood, deck-lids, quarter/side panels |
| Primary Cell Hardware 481 | Hinges, brackets |
| Glazing/Glass 482 | Front glass, sealants/adhesives; side/rear glass |
| Front/Rear Fascias 483 | Bumper fascia sub-assembly |
| Painted exterior Trim 484 | Mirror housing, wiper housing, valances head lamps, fog lamps, turn signals, side marker lights, and tail light assemblies. |
| Cell Structure Sealants 485 | Water sealant, acoustic materials |
| Fasteners 486 | Fasteners and joining materials and specifications |

*FIG. 4*

REGIONAL MANUFACTURE AND ASSEMBLY OF VEHICLE AND VEHICLE STRUCTURE

FIELD OF THE DISCLOSURE

The present disclosure relates to assembling a vehicle at an assembly point, and distributing a vehicle from a distribution point, and more particularly to methods and systems for arranging manufacturing, assembling and delivering of the vehicle's primary vehicle structure and the exterior and interior components through the operation and coordination of regional sites in proximity to the assembly point, thereby eliminating the need for an original equipment manufacturer (OEM), to utilize a conventional assembly plant to manufacture and assemble the vehicle, as is the present industry standard. As defined herein, in the context of the automotive motor vehicle manufacturing and assembly, a vehicle is a complete motor vehicle that requires no further manufacturing operations to perform its intended function (Federal Motor Vehicle Safety Standards).

As further referred to herein, the primary vehicle structure includes the vehicle's primary cell (see FIGS. 3B and 3B) consisting of, without limitation, a cabin, roof, storage, and the assembly related primary vehicle structure (see FIG. 4) components including, without limitation, painted closures, hardware, front and rear facias, glazing/glass, painted exterior trim, and sealants, required to assemble the vehicle being defined by the primary vehicle structure manufacturing bill-off-material.

Additionally, as referred to herein, exterior and interior components include the vehicle's mechanical, electrical and propulsion components and subsystems required to assemble the vehicle being defined by the exterior and interior component manufacturing bill-of-material.

BACKGROUND

It is a widely acknowledged and reported that the global automotive industry's overall return on invested capital is generally below its weighted average cost of capital. This situation is caused in large part by the capital investment required for manufacturing and assembling vehicles. This situation will further be exacerbated by changing consumer requirements including autonomous vehicles, new energy vehicles employing propulsion systems in lieu of internal combustion engines, and ride sharing/ride hailing and other subscription services in lieu of conventional vehicle ownership.

The majority of this capital investment is incurred by the OEM due primarily to conventional process methods used in the vehicle's primary vehicle structure manufacturing and assembly processes within the OEM's conventional assembly plant. Accordingly, each OEM generally maintains its own exclusive (i.e. "in-house") primary vehicle structure manufacturing processes rarely shared with other OEMs.

The OEM's conventional assembly plant typically is configured to assemble on average 250,000 vehicles per year and consists of three operations, generally in series:
  Manufacturing and assembly of the primary vehicle structure including closures (e.g. doors, hood, quarter panels and fenders)
  Anti-corrosion protection and painting of the primary vehicle structure including closures, and buffer stock inventory; and
  Final vehicle assembly including trim, chassis, functional inspection, and testing.

Primary vehicle structures are generally manufactured, assembled, and painted within the OEM's conventional assembly plant and subsequently sequenced and matched with the corresponding exterior and interior components prior to final vehicle assembly. Collectively, these components are segmented into a manufacturing bill-of-material, defining how the components and the vehicle are manufactured and assembled.

Currently exterior and interior components including the vehicle's mechanical, electrical and propulsion components and subsystems are generally purchased from outside suppliers, commonly referred to as Tier 1's, and system integrator/sequencers, including $3^{rd}$ party and $4^{th}$ party logistics providers, generally designated by the OEMs to deliver the exterior and interior components on a just-in-time or just-in-sequence basis to the OEM's conventional assembly plant for final vehicle assembly.

In most cases the manufacturing and assembly processes for primary vehicle structures, comprises a capital-intensive system layout consisting of stamping, welding, framing, assembly, corrosion protection and final painting, repair and repainting (if required), and disassembly of certain closures (e.g. doors) for parallel subassembly prior to final vehicle assembly.

As a result of decades old individual state franchise laws, predominantly all new vehicles whether assembled locally or imported, are sold through an OEM's contracted independent franchise dealer network. Customers generally have three options when purchasing a vehicle (i.e., buying, leasing or subscription). Historically, up to the current industry downturn, the vast majority of new vehicles are purchased from existing franchise dealer stock and less than 10% are custom ordered. With the introduction of Battery Electric Vehicles, reserving and pre-ordering, plays an increasing role in the new vehicle purchasing process.

Conventionally, a custom order involves configuring an order based upon a preferred vehicle profile, submitting the order to determine if can be assembled (i.e. parts availability, build combination, stop orders, etc.), and then subsequently confirming the order either directly with an independent franchise dealer, or with the OEM. Purchasing from inventory, the most common method, involves selecting a vehicle from an existing independent franchise dealer vehicle inventory. This inventory is determined by a vehicle allocation order process managed by the OEM which allows it to efficiently assemble vehicles and is determined in large part by the number of vehicles the independent franchise dealer sells. Allocated orders are verified through an OEM specific computerized vehicle ordering system (e.g. dealer management system), which not only allows the independent franchise dealer to verify vehicle models and options, but also to check on the status of allocated and/or custom vehicle orders already in process at the OEM's conventional assembly plant.

The distribution of vehicle orders, encompassed within an outbound distribution system including delivery, inventory holding, and associated marketing and selling expenses, can account for a significant cost of the new vehicle of approximating 20%-30%. Typically, vehicles are delivered by rail when the independent franchise dealer is more than one day away from the conventional assembly plant and by truck if the delivery distance is less than one day.

OEMs introducing Battery Electric Vehicles are experimenting with new distribution models encompassing holding vehicles in a central stock off franchise dealer sites, consignment stock inventory for test drives and impulse buys, and matching custom orders to inventory (batch assembly).

Introducing new methods and systems by organizing the manufacturing and assembly of the primary vehicle structure at regional sites, vehicle assembly at a regional assembly point, and aggregating confirmed order and organizing distribution from regional distribution points, the embodiments provide new ways to reduce vehicle order-to-delivery time and improve capital efficiency within the automotive industry.

BRIEF DESCRIPTION OF DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, reference numerals designate corresponding parts throughout the several views.

FIG. 2B illustrates an example of operating parameters of the regional vehicle assembly and distribution shown in FIGS. 1 and 2A according to various embodiments of the present disclosure.

FIG. 3A illustrates an example primary cell and FIG. 3B illustrates an example manufacturing bill-of-materials defining the primary cell according to various embodiments of the present disclosure.

FIG. 4 illustrates an example primary vehicle structure bill-of-materials according to various embodiments of the present disclosure.

Figure 1:
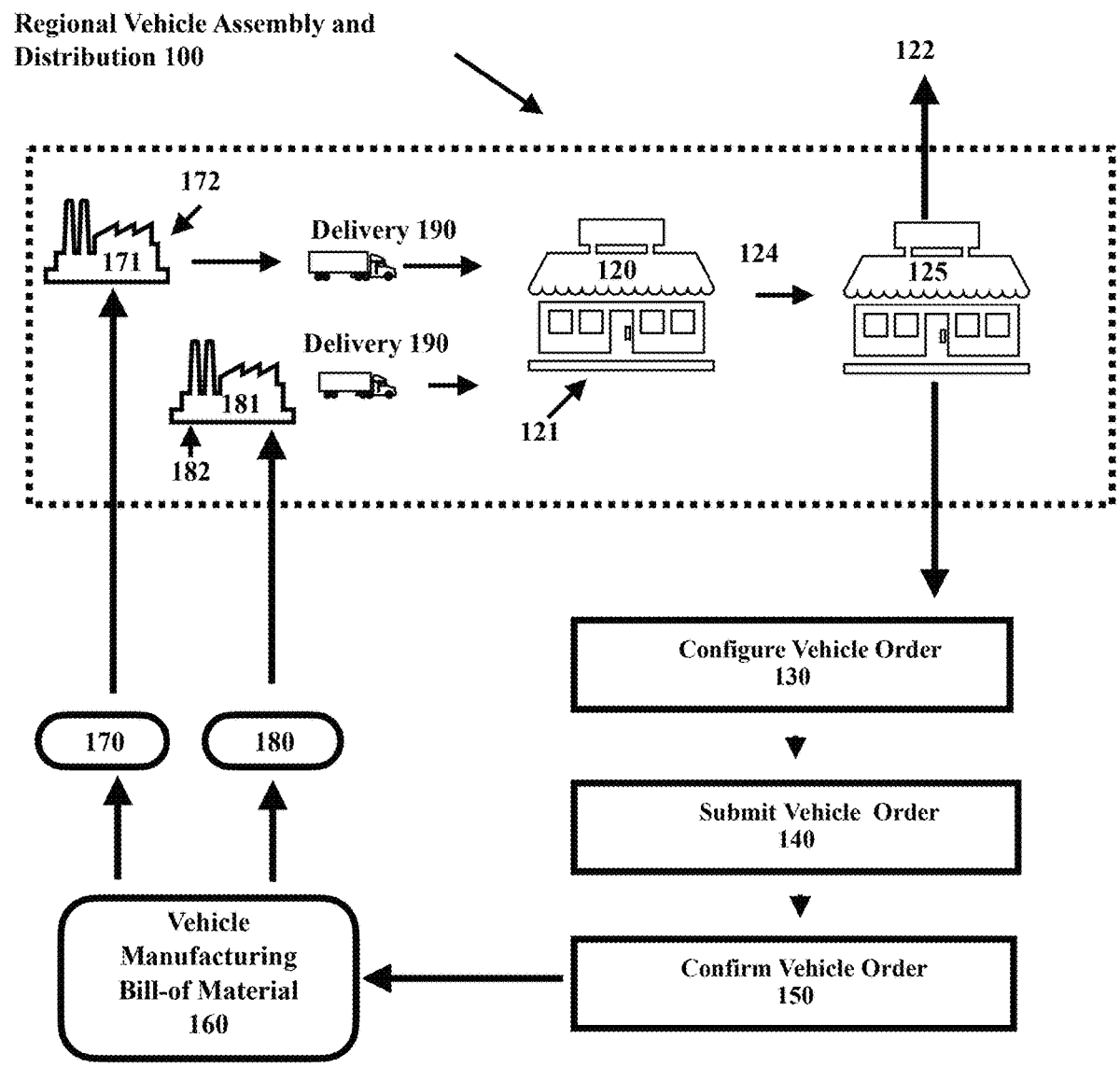
FIG. 1 illustrates the regional vehicle assembly and distribution according to various embodiments of the present disclosure.

Aspects of the regional vehicle assembly and distribution are described herein. In one embodiment, the regional vehicle assembly and distribution includes a regional site, an assembly point, and a distribution point. The regional vehicle assembly and distribution performs a process of manufacturing, assembly, and distribution of a vehicle, among other resources.

The regional vehicle assembly and distribution includes aggregating a plurality of confirmed vehicle orders from the plurality of the distribution points located in various geographic locations or regions. The regional vehicle assembly and distribution identifies a subset of the plurality of confirmed vehicle orders into one or more groups of orders, and then directs the regional sites to manufacture and assemble the primary vehicle structure, and exterior and interior components as specified in the groups of orders, based on one or more factors such as capacity utilization, type of vehicle order (e.g., sedan, truck, exterior color, option content, etc.), confirmed order-to-delivery time and proximity of the regional sites to the assembly point. The regional sites deliver the primary vehicle structure and exterior and interior components to the assembly point in accordance with the confirmed vehicle orders.

According to aspects of the embodiment, the regional vehicle assembly and distribution generates and provides a vehicle assembly scheme at the assembly point. Based on the vehicle assembly scheme, the assembly point receives the primary vehicle structure and exterior and interior components and assembles a vehicle in accordance with a confirmed vehicle order.

Once the vehicle is assembled in accordance with the confirmed vehicle order, it is assigned a unique vehicle identifier according to automotive industry standards and is processed through a quality verification process of various vehicle functional aspects. The assembly point then delivers the assembled vehicle to the distribution point. By aggregating confirmed vehicle orders from various geographic locations or regions, and co-ordinating vehicle manufacturing and assembly processes, based upon one or more process factors, the embodiments provide new ways to increase capital efficiency in the automotive industry.

The manufacturing and assembly of the primary vehicle structure and the exterior and interior components at regional sites, the assembly of the vehicle at the assembly point, and distribution of the vehicle to a distribution point that may be located at one or more geographical locations (e.g. states) or may be located among one or more geographical regions (e.g. plurality of states) including one or more regional sites, one or more assembly points and one or more distribution points, respectively. By geographically dislocating, in part or in their entirety, the manufacturing and assembly of the primary vehicle structure, the exterior and interior components, and the vehicle assembly, and co-ordinating the manufacturing and assembly processes at the regional sites and the assembly point, the embodiment provides new ways to reduce vehicle order-to-delivery time and improve capital efficiency within the automotive industry.

In other aspects of the embodiments, the regional sites manufacture and assemble the primary vehicle structure and the exterior and interior components into a sub-assemblies or module and delivers the sub-assembly or module to other regional sites, or to the assembly point. As referred to herein the meaning of a sub-assembly or module is interchangeable and can comprise any combination of components or component groups either geometrically or functionally related. For example, the regional sites can assemble a chassis module, (Refer to FIG. 5a) as described in further detail below, including one or more components or component groups. To effectively assemble the chassis module, the regional vehicle assembly and distribution includes identifying the related components or component groups of the chassis module being defined by the exterior and interior manufacturing bill-of-material, and arranging assembly of the identified related components or component groups contemporaneously at the regional sites including, for example, brakes, suspension, and steering, and error proofing the chassis module before delivery to other regional sites, or to the assembly point. By identifying and arranging contemporaneously the manufacturing and assembly of the primary vehicle structure, and exterior and interior components into a sub-assembly or module, or a plurality of sub-assemblies or modules, and coordinating delivery to the assembly point, the embodiments described herein provides new ways to reduce the vehicle order-to-delivery time and improve capital efficiency within the automotive industry.

In the interest of clarity, not all features of an actual implementation are described in this disclosure. It will, of course, be appreciated that in the development of any such actual embodiment, numerous design, manufacturing, assembly, and process quality control factors must be considered in order to manufacture, assemble and deliver the primary vehicle structure, and exterior and interior components, and assemble the vehicle being defined by the vehicle manufacturing bill-of-material. Moreover, it should be understood that some of the factors may be supplemented with additional factors or that the order of some of the factors may be changed without deviating from the present disclosure. It is noted that the embodiments are not limited to the manufacture and assembly of any particular type(s) of the primary vehicle structure from any particular type(s) of materials and the manufacturing and assembly of any particular type of vehicle. Further, the primary cell and closures, may be comprised of a combination of composites, ferrous and non-ferrous materials, or any combination thereof. Instead, the embodiments described herein can be applied to the manufacture and assembly of a wide array of primary vehicle structures, exterior and interior components, and types of vehicles.

FIG. 1 illustrates the regional vehicle assembly and distribution 100 according to various embodiments of the present disclosure. The regional vehicle assembly and distribution 100 includes the assembly point 120, the distribution point 125, and the regional site 172 for the manufacturing of the primary vehicle structure 171, and the regional site 182 for the manufacturing of the exterior and interior components 181. (collectively "regional sites 172 and 182", individually "regional site 172 or regional site 182").

The assembly point 120, the distribution point 125, and regional sites 172 and 182, are geographically dislocated. The relative geographic locations of regional sites 172 and 182, the assembly point 120, and the distribution point 125 are illustrated in further detail below with reference to FIG. 2A, and the embodiments can be organized or situated in other ways than that shown. The regional sites 172 and 182 can include a combination of manufacturing, sub-assembly, module assembly, and logistics processes. Further, the regional sites 172 and 182 may be organized in parallel or in series manufacturing and assembly processing depending upon the embodiment.

Although not shown in FIG. 1, the regional vehicle assembly and distribution 100 manages data communication between the assembly point 120, and the distribution point 125, and the regional sites 172 and 182, among other resources.

In this context, the distribution point 125 configures a client vehicle order 130, submits the vehicle order 140, and confirms the vehicle order 150 within the regional vehicle assembly and distribution 100 (e.g. confirms build combination of vehicle as configured and order-to-delivery time) based on information from the regional sites 172 and 182, the vehicle manufacturing bill-of-material 160, and the assembly point 120. Additionally, the assembly point 120 is assigned a vehicle assembly 121, and the distribution point 125 is assigned a vehicle distribution 122 to the client. The assembly point 120 delivers 124 the confirmed vehicle order 150, to the distribution point 125.

In operation, the regional vehicle assembly and distribution 100 aggregates the plurality of confirmed vehicle orders 150 from the distribution point 125. The plurality of confirmed vehicle orders can be received over time, for example, and transmitted to the regional site 172 for manufacturing and assembly of the primary vehicle structure 171, and to the regional site 182 for manufacturing and assembly of the exterior and interior components 181.

Figure 6:
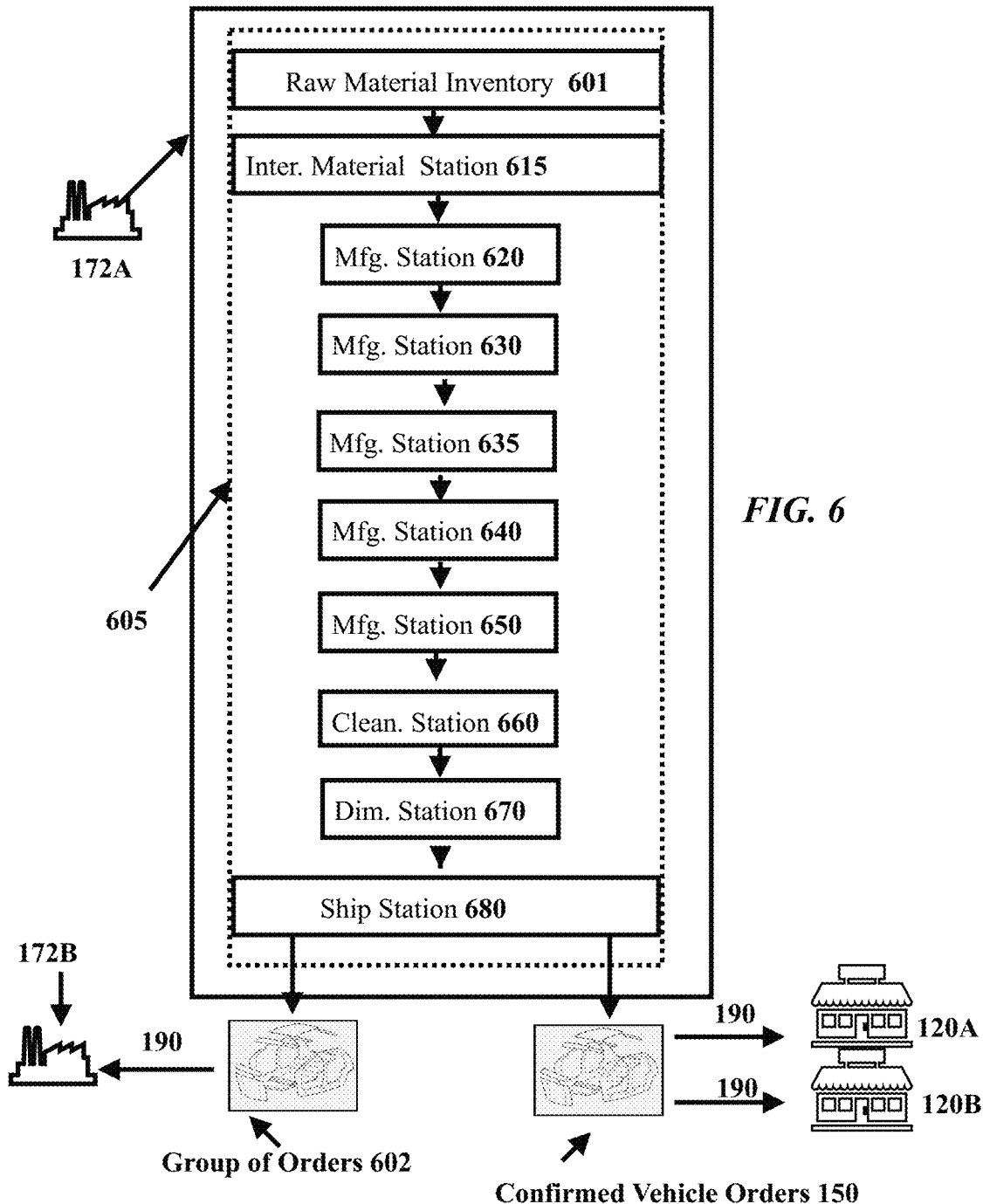
Figure 7:
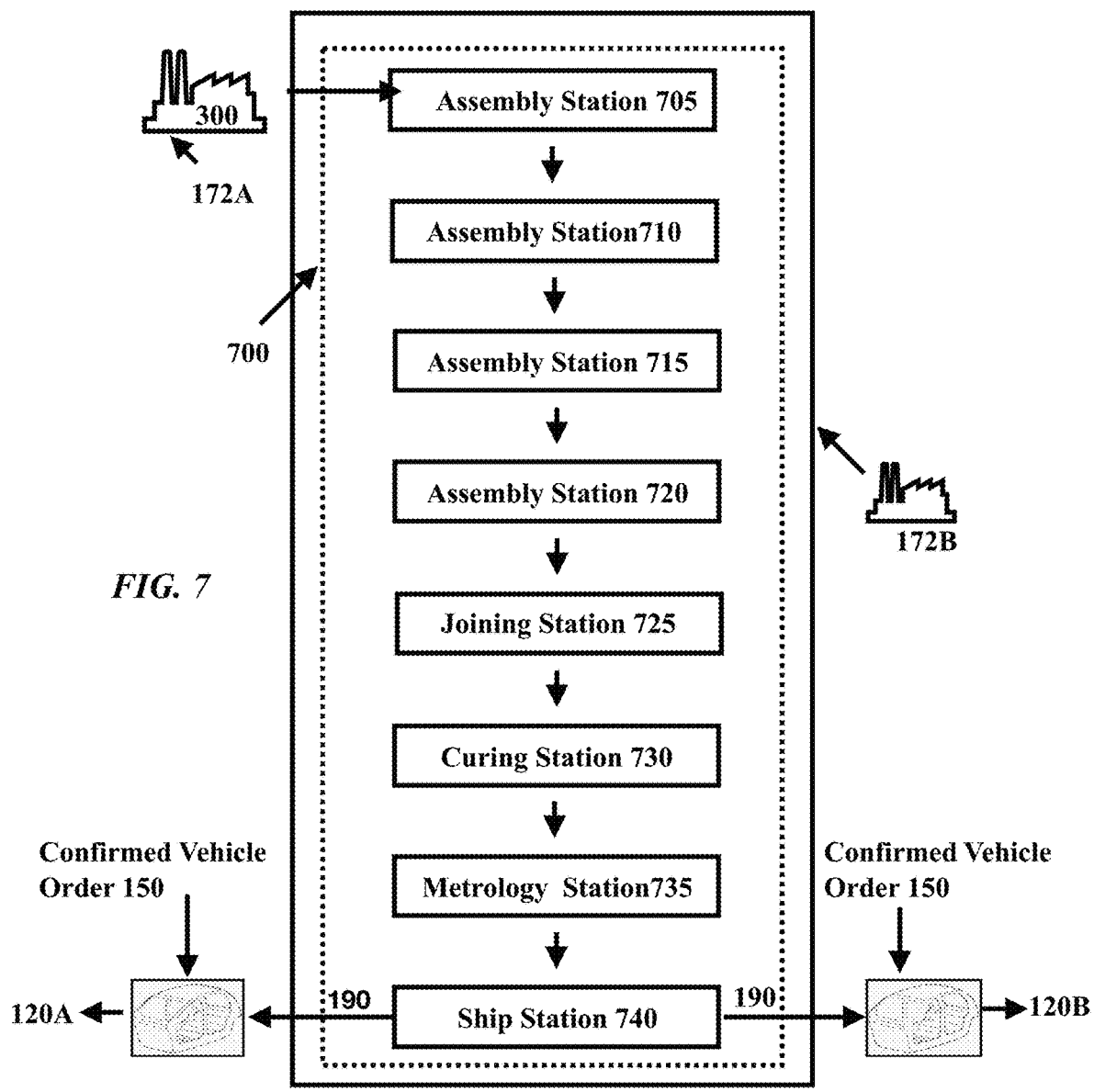

Upon receipt of the plurality of confirmed vehicle orders 150, the regional vehicle assembly and distribution 100 aggregates a subset of the plurality of confirmed vehicle orders into a group of orders, based on one or more factors such as capacity utilization, type of vehicle order (e.g., sedan, truck, exterior color, option content, etc.), order-to-delivery time required and proximity of the regional sites to the assembly point as described in further detail below with reference to FIGS. 5, 6 and 7. By aggregating the plurality of confirmed vehicle orders 150 into a group of orders from a plurality of distribution points 125 and coordinating manufacturing and assembly of the primary vehicle structure 171 and the exterior and interior components 181, the regional vehicle assembly and distribution 100 provides new methods to reduce vehicle order-to-delivery times and improve capital efficiency within the automotive industry.

In this embodiment the primary vehicle structure 171, being defined by the primary vehicle structure bill-of-materials 170, is manufactured and assembled at the regional site 172. The primary vehicle structure 171 is described in further detail below with reference to FIGS. 3A, 3B and 4. The primary vehicle structure 171 can be representative of one or more sections or portions of materials and other related components of the component level 405 as described further in FIG. 4. but not limited to, painted closure panels, primary cell hardware, glazing/glass, front/rear facias, painted exterior trim, cell structure sealants, and fasteners as described in further detail below with reference to FIGS. 3A, 3B, 4 and 5. In other embodiments, depending upon the confirmed vehicle order 150, based on the type of vehicle ordered (e.g., sedan, truck, exterior color, option content, etc.) and other factors, the primary vehicle structure 171 may be delivered 190 to the assembly point 120 as sub-assemblies or modules, as referred to herein.

The exterior and interior component 181, being defined by the exterior and interior components manufacturing bill-of-materials 180, are manufactured and assembled at the regional sites 182. The exterior and interior components 181 are described in further detail below with reference to FIG. 5. The exterior and interior components 181 can be representative of one or more sections, components, portions of materials and other related components as described further in FIG. 5. Depending upon the confirmed vehicle order 150, based on the type of vehicle ordered (e.g., sedan, truck, exterior color, option content, etc.) and other factors, the exterior and interior components 181, are delivered 190 to the assembly point 120, as sub-assemblies or modules, as referred to herein.

The assembly point 120, is configured to assemble 121 the confirmed vehicle order 150 by a vehicle assembly scheme 835, being defined by the vehicle manufacturing bill of material 160, as described in further detail below with reference to FIG. 8.

After the confirmed vehicle order 150 is assembled 121 at the assembly point 120, the assembly point 120 assigns a unique vehicle identifier to the confirmed vehicle order 150, and delivers 124 the confirmed vehicle order 150 to a distribution point 125 for distribution 122 of the confirmed vehicle order 150 to a client. The distribution point 125 is assigned servicing 123 the confirmed vehicle order 150, as required.

Figure 2A:
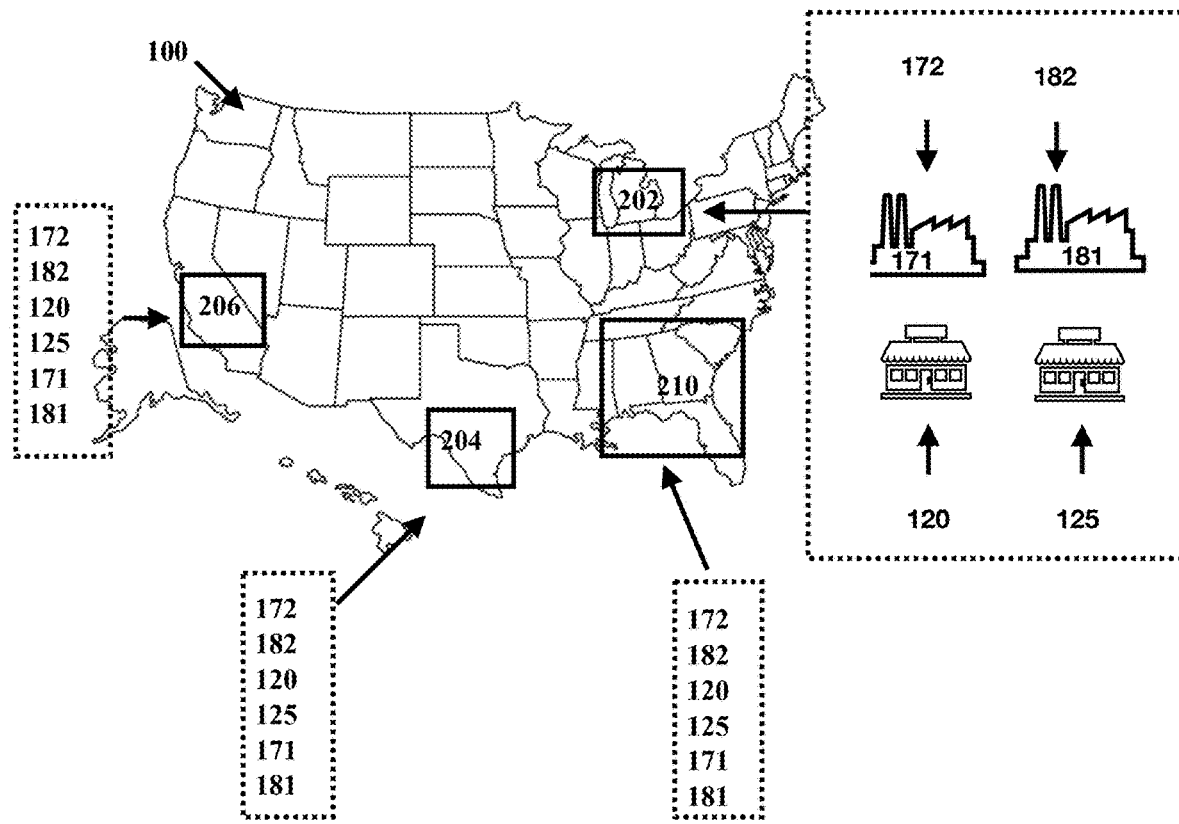
FIG. 2A illustrates a geographical view of the regional vehicle assembly and distribution shown in FIG. 1 according to various embodiments of the present disclosure.

FIG. 2A illustrates a geographical view of the regional vehicle assembly and distribution 100 shown in FIG. 1 according to various embodiments of the present disclosure. In addition to the regional vehicle assembly and distribution 100, the assembly point 120, the distribution point 125, the regional sites 172 and 182, the primary vehicle structure 171, and the exterior and interior components 181 shown in FIG. 1, FIG. 2A further illustrates an example group of orders 600 of the plurality of confirmed vehicle orders 150, a plurality of geographic locations (e.g. states) 202, 204 and 206 and a geographic region 210 (e.g. a plurality of states).

The example group of orders 600 can be embodied as the plurality of confirmed vehicle orders 150 identified over time from the plurality of at least one of the distribution points 125, situated at different geographic locations (e.g. states) or geographic regions (e.g. plurality of states). In that context, although not shown in FIG. 2A, the group of orders 600 can be based on the type of vehicle ordered (e.g., sedan, truck, exterior colour, option content, etc.) and other factors without limitation. Further, the types of vehicles ordered can also comprise vehicle factors including vehicle platform, vehicle architecture, vehicle model variants, and multi-variant build combinations, among other factors.

For example, if a plurality of confirmed orders 150 originates in the geographic location within the state of Michigan 202, the regional vehicle assembly and distribution 100 can aggregate those confirmed vehicle orders 150 into a group of orders 602 for manufacturing and assembly of the primary vehicle structure 171 at the regional site 172, and the manufacturing and assembly of exterior and interior components 181 at the regional site 182, based on the group of orders 602, and the regional vehicle assembly and distribution 100 can arrange for vehicle assembly 121 at the assembly point 120 (FIG. 8) located within the state of Michigan 202. Further, a plurality of confirmed vehicle orders 150 originates from the geographic location within the state of Texas 204, the regional vehicle assembly and distribution 100 can aggregate those confirmed vehicle orders 150 into a group of orders 604 for manufacturing and assembly of the primary vehicle structure 171 at the regional site 172, and the exterior and interior components 181 at the regional site 182, based on the group of orders 604, and the regional vehicle assembly and distribution 100 can arrange for vehicle assembly 121 at the assembly point 120 located with the state of Texas. 204. Still further, if a plurality of confirmed vehicle orders 150 originates in the geographic location within the state of California 206, the regional vehicle assembly and distribution 100 can aggregate those confirmed vehicle orders 150 into a group of orders 606 for manufacturing and assembly of the primary vehicle structure 171 at the regional site 172, and the manufacturing and assembly of exterior and interior components 181 at the regional site 182, based on the group of orders 606, and the regional vehicle assembly and distribution 100 can arrange for vehicle assembly 121 at the assembly point 120 (FIG. 8) located within the state of California 206. Any given group of the orders 602, 604, and 606, can be associated with one or more of the pluralities of the confirmed vehicle orders 150 in any given geographic location.

FIG. 2A further illustrates a group of orders 600 of the confirmed vehicle orders 150 can be identified over time from the plurality of at least one distribution points 125 at different geographic regions (e.g. plurality of states). For example, if the plurality of confirmed orders 150 originates in the geographic region 210, encompassing, at least in part, the states of Florida, Georgia, Alabama, South Carolina, Tennessee and Mississippi, the regional vehicle assembly and distribution 100 can aggregate those confirmed vehicle orders 150 into a group of orders 610 (e.g. 410 vehicles) for manufacturing and assembly of the primary vehicle structure 171 at the regional site 172, and the manufacturing and assembly of exterior and interior components 181 at the regional site 182, based on the group of orders 602, and the regional vehicle assembly and distribution 100 can arrange for vehicle assembly 121 at the assembly point 120 (FIG. 8) located within the geographical region (e.g. plurality of states) 210. Any given group of the orders 610, can be associated with one or more of the pluralities of the confirmed vehicle orders 150 in any given geographic region.

Within the at least one of the geographic locations 202, 204 and 206, and the geographic region 210, the regional sites 172 and 182 can be located in proximity to the assembly point 120 and the distribution point 125.

As described in further detail below with reference to FIG. 5 the regional sites 182 can be configured to manufacture and assemble the exterior and interior components 181 and deliver 190 the exterior and interior components 181 to the assembly point 120.

As described in further detail below with reference to FIG. 5B the regional site 172 can be configured to manufacture and assemble the primary vehicle structure 171 and deliver 190 the primary vehicle structure 171 to the assembly point 120.

The regional sites 172 and 182 can be embodied as any suitable type of site/s for manufacturing and assembly, including but not limited to process control, inventory storage, logistics, and material handling for the group of orders 600 and delivery 190 as shown in FIG. 1.

Figure 8:
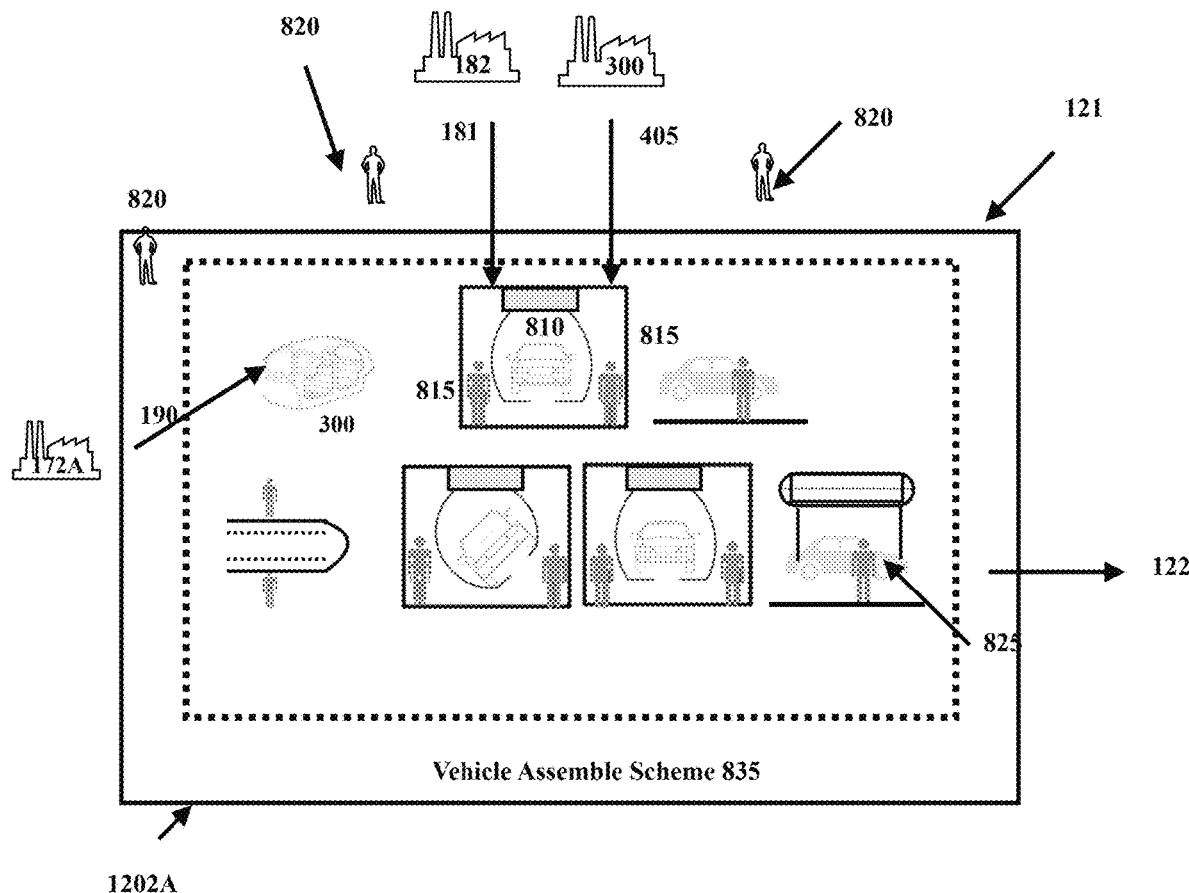
FIG. 8 illustrates an example vehicle assembly module employed at the assembly point according to various embodiments of the present disclosure.

As described in further detail below with reference to FIG. 8, the assembly point 120 can be embodied as an arrangement of one or more assembly stations, conveyors, and associated assembly processes required by the assembly point 120 to assemble 121 the confirmed vehicle order 150 defined by the vehicle manufacturing bill-of-material 160 on a vehicle assembly module 850 according to a vehicle assembly scheme 835 (FIG. 8).

The relative locations of the assembly point 120, the distribution point 125, and the regional sites 172 and 182 are illustrated in FIG. 2A, and these embodiments can be organized or located in other ways than that shown. Generally, by locating and operating the regional sites 172 and 182 in proximity to the assembly point 120, according to an example operating parameters 250 as described in further detail below with reference to FIG. 2B, the embodiments described herein provide new ways to reduce vehicle order-to-delivery time and improve capital efficiency within the automotive industry.

FIG. 2B illustrates an example group of operating parameters 250 of the regional vehicle assembly and distribution shown in FIGS. 1 and 2A according to various embodiments of the present disclosure. For illustration purposes, in the following example, the group of operating parameters 250 includes a group of operating metrics 251, comprising a vehicle distribution metric 252, a vehicle assembly metric 254, and an aggregate number of assembly points and distribution points metric 256.

For example, the vehicle distribution metric 252 numerically shows the vehicle distribution of 50,000 confirmed vehicle orders distributed annually from the plurality of distribution points 125. In this context, the distribution point 125 is configured to numerically distribute the vehicle distribution metric 252 of 50,000 vehicle annually at a rate of four vehicles/day over a period of two hundred fifty working days. The vehicle assembly metric 254 numerically shows the vehicle assembly of 50,000 confirmed vehicle orders assembled annually from the plurality of assembly points 120. In this context, the assembly point 120 is configured to numerically assemble the vehicle assembly metric 254 of 50,000 vehicle annually at a rate of four vehicles/day over a period of two hundred fifty working days. Thus, for example, there can be an aggregate number metric 256 of fifty assembly points 120 and an aggregate number metric 256 of fifty distribution points 125 situated in diverse geographic locations or regions as discussed above with reference to FIG. 2A.

Although the description of the operating parameters 250 embodiment is generally provided in the context of the manufacturing and the assembly of confirmed vehicle orders 150, it is noted that the embodiment is not limited to the descriptive types of the operating metrics 251 shown in FIG. 2B. Instead, the operating metrics 251 can include other descriptive types including but not limited to amount and value of vehicle inventory, vehicle assembly cycle time, order-to-delivery time, logistics costs, among other factors.

Further, in some embodiments, the operating metrics 251 embodiment is not limited to the numerical values shown in FIG. 2B. For example, the vehicle distribution metric 252 can be numerically different than that shown in FIG. 2B. Additionally, the vehicle assembly metric 254, and the aggregate number of assembly points and distribution points metric 256 may also be different than that shown in FIG. 2B. In other embodiments, the aggregate number 256 of assembly points and distribution points can be increased or decreased within a geographic location or region as discussed above with reference to FIG. 2A. Still, in other embodiments the number of assembly working days (e.g. 250 days) can be increased or decreased.

The operating parameters 250 can be configured based upon the group of orders 600 for a given geographic location or region (FIG. 2A). For example, in one embodiment there may be one assembly point 120 in a given geographic location (e.g. state) while in other embodiments there may be the plurality of assembly points 120 in a given geographic location (e.g. state). Alternatively, the number and location of the distribution points 125 can be configured based upon the confirmed vehicle order 150 in a given geographic region (e.g. plurality of states), and the embodiments can be organized or distributed in other ways than that shown.

FIG. 3A illustrates an example primary cell 300 according to various embodiments of the present disclosure. The example is representative of the shape and extent of the primary cell 300 but does not necessarily define information for manufacturing and assembly of the primary cell 300.

FIG. 3B illustrates an example primary cell manufacturing bill-of-materials 170A according to various embodiments of the present disclosure. The primary cell manufacturing bill-of-material 170A defines the individual parts of the primary cell, and the manufacturing and assembling of the individual parts of the primary cell 300 as shown in FIG. 3A including a component level 301, a part number 302, a manufacturing type 303, a process designator 304, and a quantity 305 required to manufacture and assemble the primary cell 300 in accordance with the confirmed vehicle order 150. Although not shown in FIG. 3B, the primary vehicle structure bill-of-material 170A can also include assembly specifications, in-process quality testing, joining methods, and an order of manufacturing and assembly operations.

In this embodiment shown in FIG. 3B the primary cell 300 includes a front bulkhead 308; a floor 310 consisting of a front floor 311, a rear floor 312, and cross brace 330. In another embodiment, the floor 310 may consist of only one component. In still another embodiment, the floor 310 may consist of several components, sub-assemblies, or modules. Fitted to the floor 310 is a cross brace 330. In another embodiment, additional cross braces 330 may be added as needed. To the rear of the primary cell 300 is a rear valance 313. The left hand and right-hand variations (e.g. LH/RH) side panels 328 and 329 are comprised of LH/RH A-pillars 320 and 321, LH/RH B-Pillars 322 and 323, LH/RH C-Pillars 324 and 325, LH/RH inner C-Pillars 326 and 327, and LH/RH side sills 340 and 341. In another embodiment, the LH/RH side panels 328 and 329 may comprise one sub-assembly or module. In still another embodiment, LH/RH side panels 328 and 329 may consist of several components including an inner and outer panel component. A roof 360 comprising a side cant rail 342 and side cant rail 343, LH/RH side cant rails 350, 351. In another embodiment, the front and rear cant rails 350, and 351 may not be needed depending upon the confirmed vehicle order 150. In still another embodiment, the roof 360 may include a number of cross braces. Further, the primary cell 300, may be comprised of a combination of composites, ferrous and non-ferrous materials, or any combination thereof. Instead, the embodiments described herein can be applied to the manufacture and assembly of a wide array of primary vehicle structures, and types of vehicles.

Although not depicted in FIG. 3A, the primary cell manufacturing bill-of-material 170A includes joining materials 370 required for joining and fastening the components levels 301 to assemble the primary cell 300.

The primary cell manufacturing bill-of-materials 170A is provided by way of example of the types of technical information that can be included or defined in a manufacturing bill-of-material, but is not intended to be limiting, as the technical information requirements of the confirmed vehicle order 150 will vary.

Further, the primary cell manufacturing bill-of-materials 170A is not necessarily representative of the format of the types of technical information that can be included or defined in a manufacturing bill-of-material. In various embodiments, the primary cell vehicle structure manufacturing bill-of-materials 170A can be embodied as computer aided software, digital or electronic files or other types of computer aided drawings.

Thus, the regional vehicle assembly and distribution 100 can direct the manufacturing operations being defined by the primary cell manufacturing bill-of-material 170A and the exterior and interior components manufacturing and assembly operations as described in further detail below with reference to FIG. 5, and the vehicle assembly operations as described in further detail below with reference to FIG. 8.

FIG. 4 illustrates an example primary vehicle structure manufacturing bill-of-materials 170 according to various embodiments of the present disclosure. As compared to the primary cell manufacturing bill of materials 170A, the primary vehicle structure bill-of-materials 170 further includes manufacturing and assembly processing for the assembly related primary vehicle structure components. In this embodiment, a component level 405, and an associated component description 408 is provided in accordance with the confirmed vehicle order 150, including the primary cell 300 as referenced in FIG. 3B, painted closure panels 480; primary cell hardware 481; glazing/glass 482; front/rear facias 483 painted exterior trim 484; cell structure sealants 485; and fasteners 486. Although not shown in FIG. 3B, the primary vehicle structure manufacturing bill-of-materials 170 can also include assembly specifications, in-process quality testing, joining methods, and an order of assembly operations for the manufacturing and assembly of exterior and interior components 181.

As discussed above with reference to FIGS. 3A and 3B, the primary vehicle structure manufacturing bill-of-materials 170 is not necessarily representative of the format of the types of technical information that can be included or defined in a manufacturing bill-of-materials. In various embodiments, the primary vehicle structure manufacturing bill-of-materials 170 can be embodied as computer aided software, digital or electronic files or other types of computer aided drawings. The manufacturing and assembly of the primary vehicle structure manufacturing bill-of-material 170 can be communicated to the primary cell manufacturing and assembly regional site 172, the exterior and interiors manufacturing and assembly regional site 182 by the regional vehicle assembly and distribution 100.

Based upon the primary vehicle structure manufacturing bill-of-materials 170, the regional site 172, for example, can arrange manufacturing and assembly using types of equipment to aggregate and match same color painted components such as the painted closure panels 480 and the painted exterior trim 484 among the confirmed vehicle orders 150 to provide new ways to reduce order-to-delivery time and increase capital efficiency.

Additionally, aggregating one or more subsets of the confirmed vehicle orders 150 into a group of the orders 600, based on vehicle type ordered, (e.g., sedan, truck, exterior color, option content, etc.), and other factors, provides for manufacturing and assembly efficiency of the similar component level 405. For example, a group of orders may include a two-door model vehicle type with a specified exterior colour and interior trim option. Accordingly, regional site 172 will configure the number and types of the component level 405 required for the manufacturing and assembly of the two-door vehicle type and generate instructions to place all component level 405 for the group of orders 600 for the two-door vehicle type in one delivery 190 to the assembly point 120. Alternatively, if the group of orders 600 is manufactured and assembled for a plurality of assembly points 120, regional sites 172 will configure the number of group of orders 600 and generate instructions deliver 170 component level 405 associated with the group of order 600. By aggregating orders from various geographic locations or regions and co-ordinating the primary vehicle structure 171 manufacturing and assembly processes, the embodiments provide new ways to reduce order-to-delivery time and increase capital efficiency in automotive vehicle manufacturing.

Figures 5A, 5B:
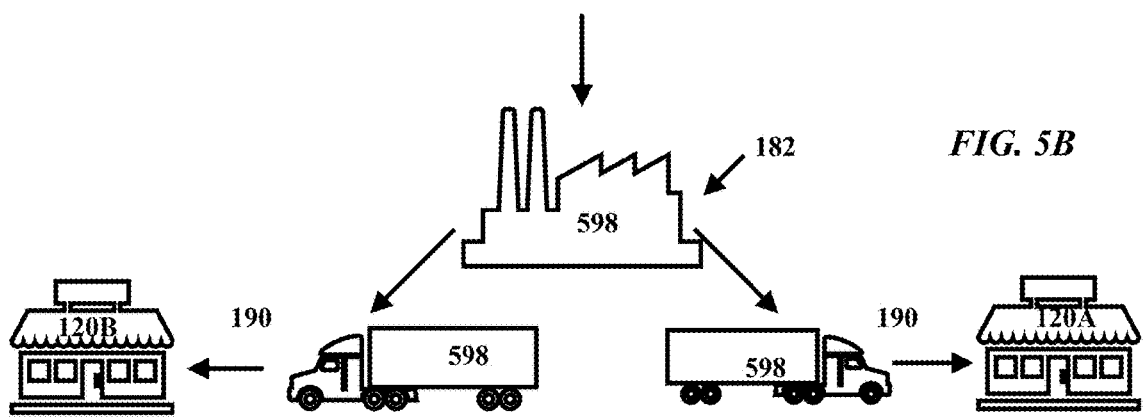
FIG. 5A illustrates an example exterior and interior component manufacturing bill-of-materials according to various embodiments of the present disclosure.
FIG. 5B further illustrates the example exterior and interior components manufacturing bill-of material in FIG. 5A according to various embodiments of the present disclosure.

FIG. 5A illustrates an example exterior and interior component manufacturing bill-of-material 180 according to various embodiments of the present disclosure. As discussed above, the exterior and interior component bill-of-material 180 defines the individual parts of the exterior and interior component 181, and the manufacturing and assembling of the individual parts of the exterior and interior component 181. Also shown is a component designator 500, in accordance with the confirmed vehicle order 150. Although not shown in FIG. 5, the exterior and interior manufacturing bill-of-material 180 and can include a subset of databases for example, along with any other vehicle specifications, manufacturing and assembly instructions, technical and quality control aspects, and other information.

For example, in this embodiment, the component designator 500 includes a propulsion/powertrain 510, a power system 520, a driveline 525, an exhaust system 530, a powertrain electrical 535, lubrication/oils/fluids 540, fasteners/adhesives 545, a suspension 550, a braking 555, wheels/tires 560, a steering 565, an instrument panel 570, a cockpit 575, interior trim insulation 580, seating 585, heating, ventilation and air conditioning system (e.g. HVAC) 590, an interior electrical 595 and a chassis 598. In some embodiments, the exhaust system 530 may not be necessary based on the type of propulsion/powertrain 510 (e.g. battery electric) specified with the confirmed vehicle order 150. In other embodiments, the power systems 520 can be specified as gasoline, diesel, battery, or fuel cell delivery.

Although the exterior and interior components 181 are generally provided in the context of the manufacturing and assembly of the group of orders 602 as described below with reference to FIG. 5B, it is noted that the embodiments are not limited to these exterior and interior components 181 and can comprise other components, or components referenced with different nomenclature. Further, the exterior and interior bill of material 180 as shown in FIG. 5A is provided by way of example and is not necessarily representative of the format of the types of technical information that can be included or defined in a manufacturing bill-of-material. In various embodiments, the exterior and interior manufacturing bill-of-material 180 can be embodied as computer aided software, digital or electronic files or other types of computer aided drawings.

FIG. 5B further illustrates the example exterior and interior manufacturing bill-of materials 180 in FIG. 5A according to various embodiments of the present disclosure. As compared to FIG. 5A, FIG. 5B further includes a group of orders 602 (FIG. 2A) of the confirmed vehicle orders 150, the chassis 598, as shown in FIG. 5A, the regional site 182, the assembly point 120A, and the assembly point 120B geographically dislocated (Collectively, assembly point 120A, and assembly point 120B). In this context, the group of orders 602 comprises aggregating the confirmed vehicles orders 150 from each of the assembly points 120A and 120B, respectively. The chassis 598 is shown manufactured at the regional site 182 and delivered to each of the assembly points 120A and the assembly point 120B in accordance with a group of confirmed vehicle orders 602 from the assembly points 120A and B, respectively. The chassis 598 is shown by way of example of the types of exterior and interior components 181 (FIG. 5A) that can be manufactured and assembled at the regional sites 182, being defined by the exterior and interior manufacturing bill-of-material 180.

The regional vehicle assembly and distribution 100 can direct one or more groups of orders 602 (FIGS. 1, and 2A) to one or more regional sites 182 for manufacturing and assembly of exterior and interior components 181. The regional vehicle assembly and distribution 100 can also coordinate the manufacturing and assembly operations of the regional sites 182 with the manufacturing and assembly operations of the regional sites 172 and the assembly operations of the assembly points 120A and 120B, respectively.

The exterior and interior components 181 can be representative of one or more groups of exterior and interior components, sub-assemblies, or modules manufactured and assembled for one or more groups of orders 602. For example, as shown in FIG. 5B, when arranging delivery 190 of the chassis 598 to the assembly points 120A and assembly point 120B, the regional site 182 is configured to arrange the manufacturing and assembly of the chassis 598 among other exterior and interior components 181 to the extent possible to reduce vehicle order-to-delivery time. Additionally, or alternatively, the regional site 182 may be configured to arrange the chassis 598 manufacturing and assembly to align, either in series or contemporaneously, with the regional site 171 manufacturing and assembly of the primary vehicle structure 171 in accordance with the group of orders 602. In other words, the exterior and interior components 181 may be manufactured and assembled before, during or after the manufacturing and assembly of the primary vehicle structure 171 to the extent that the confirmed vehicle orders 150 can be distributed 122 within the specified order-to-delivery time. Thus, in the regional site 182, for example, the manufacturing and assembly can be arranged for operations using that same type of group orders, based upon on the type of vehicle ordered (e.g., sedan, truck, exterior colour, option content, etc.) and other factors, Although not shown in FIG. 5B, in still other embodiments, the plurality of exterior and interior components 181 can be manufactured, assembled, and delivered 190 as components, sub-assemblies or modules to the assembly point 120 A. For example, the chassis 598 can be manufactured, assembled, and delivered 190 to the assembly point 120A for vehicle assembly 121. In another embodiment, the chassis 598 can be delivered in a plurality of sub-assemblies to the assembly point 120A, where the chassis 598 is assembled before the vehicle assembly 121 and the primary cell 300 can be mounted and fastened directly onto the chassis 598. In another embodiment, the primary cell 300 can be configured with structural frames mounted to the front and rear of the primary cell 300. These frames can be used to mount the other exterior and interior components 181 including suspension 550, steering 565 and propulsion/powertrain 510. In this embodiment, the power systems 520 can be mounted directly to the primary cell 300. In another embodiment, the primary cell 300 may have a separate chassis 598, and the suspension 550, the propulsion/powertrain 510 and the power system 520 would all be mounted directly to the primary cell 300. Thus, in the regional site 182, for example, the manufacturing and assembly can be arranged for operations, based on that same type of group of orders 602.

The group of orders 602 are delivered 190 to the assembly point 120A, and the assembly point 120B according to the confirmed vehicle orders 150.

Generally, by aggregating confirmed vehicle orders 150 into a group of orders 602 from the plurality of the assembly points 120A and assembly point 120B and coordinating the exterior and interior components 181 manufacturing and assembly processes at the regional site 182, the regional vehicle assembly and distribution 100 provides new ways to reduce order-to-delivery time and increase capital efficiency.

FIG. 8 illustrates an example vehicle assembly 121 with reference to FIG. 1 at the assembly point 120 according to various embodiments of the present disclosure. The vehicle assembly 121 includes a vehicle assembly module 850. In this embodiment the vehicle assembly module is configured as a static assembly station 810 with a power rotary hook as shown in several perspectives including top, front, front (rotational) and side perspectives. Further the vehicle assembly module 850 includes at least one assembly technician 815, at least one logistic support technician 820, and at least one functional test technician 825. It is noted that FIG. 8 is provided as a representation of the vehicle assembly module 850 configured to perform the vehicle assembly 121, and other embodiments can include alternative arrangements of conveyors, lifts, platforms, and additional stations. In other embodiments, the vehicle assembly module 850 can be moved along a power overhead conveyor. In still other embodiments the vehicle assembly module 850 can be moved manually.

FIG. 8 also illustrates the group of orders 602 as discussed above with reference to FIGS. 2A and 5B. In this context, the example of confirmed vehicles orders 150 include the plurality of confirmed vehicle orders (e.g. 8 vehicles) aggregated by the assembly point-of-sale 120 A. The regional vehicle assembly and distribution 100 can forward groups of orders (FIGS. 1 and 2A) to the assembly point 120 for the vehicle assembly 121 being defined by the vehicle manufacturing bill-of-materials 160. Thus the regional vehicle assembly and distribution 100 can facilitate two-way communication and also monitor the assembly operations of the assembly point 120A to coordinate the vehicle assembly processes of the assembly point 120 with the manufacturing and assembly processes being performed by the regional sites 172A, 172B and 182, based in part on the order-to-delivery time and other processes factors.

As shown in FIG. 8, in this embodiment, the primary cell 300 is delivered 190 from the regional site 172A to the assembly point 120. Contemporaneously, the assembly related primary vehicle structure components 405 and the exterior and interior components 181 are delivered 190 from the regional sites 172 and 182, respectively, to the assembly 120. The logistic support technician 820 monitors the delivery 190 and directs the primary cell 300, the primary vehicle structural components 301, and the exterior and interior components 181 to the static assembly station 810 according to direction provided by the assembly technician 815.

As described herein, the vehicle assembly module 850 is configured to perform a vehicle assembly scheme 835 being defined by the vehicle manufacturing bill-of-material 160, representing one or more steps or executions, or a combination of steps or executions in an assembly scheme required for vehicle assembly 121. In one embodiment, the vehicle assembly scheme 835 may comprise assembly steps or executions performed by the assembly technician 815 in series. In another embodiment, the vehicle assembly scheme 835 may comprise assembly steps or executions performed by two assembly technician 815 located on opposite side of the vehicle. In still another embodiment, the vehicle assembly scheme 835 may comprise assembly steps or executions performed by the assembly technicians 815 contemporaneously, or any combination thereof, until the vehicle is assembled being defined by the manufacturing bill-of-material 160.

In this embodiment, two assembly technicians 815 positioned on either side of the static assembly station 810 are shown in FIG. 8. In other embodiments two assembly technicians 815 can be positioned on the same side of the static assembly station 810 depending upon the confirmed vehicle order 150 being assembled. In still other embodiments there may be additional assembly technicians 815 positioned at or near the static assembly station 810.

As part of the vehicle assembly scheme 835, one or more of the assembly related primary vehicle structure components 405, and the exterior and interior components 181 can be assigned for placement into the static assembly station 810. Particularly, depending upon the type of the confirmed vehicle orders 150 being assembled, the logistic support technician 820 can generate instructions for placing the primary vehicle structure components 405 and the exterior and interior components 181 near the static assembly station 810. In one embodiment, the assembly related primary vehicle structure 405 and the exterior and interior components 181 may be transferred to the static assembly station 810 using gravity chutes, intermediary conveyors, or other mechanisms.

Although not shown in FIG. 8, the assembly point 120 can be directed by the regional vehicle assembly and distribution 100 to perform the assembly of the primary cell 300, to reduce order-to-delivery time.

As part of the vehicle assembly scheme 835, the assembly point 120 verifies the quality certification of the vehicle assembly 850 and the vehicle assembly scheme 835 according to standardized process controls, as defined by the vehicle manufacturing bill-of-material 160. In one embodiment verifying the quality certification of the vehicle assembly module 850 and the vehicle assembly scheme 835 can include assembling a plurality of vehicles (e.g. pre-production), as necessary, to verify the quality certification.

Similarly, for illustrative purposes, FIG. 8 shows the functional test technician 825 positioned to check and verify various functional aspects of the confirmed vehicle order 150 including static and dynamic testing including but not limited to wheelbase geometry adjustment, headlights adjustment, driver assisting systems functionality, roller dynamometer as well as other vehicle functionality testing as defined by the vehicle manufacturing bill-of-material 160.

Once the vehicle assembly scheme 835 is completed, the unique vehicle identifier is assigned to the confirmed vehicle order 150, and the assembly point 120 delivers 124 the confirmed vehicle order 150 based on the unique vehicle identifier to a distribution point 125. In one embodiment the distribution point 120 distributes 122 the confirmed vehicle order 150 to a client. In other embodiments the distribution point 125 stores, the confirmed vehicle order vehicle 150 in inventory.

The flowcharts, block diagrams and schematics are representative of certain processes, functionality, and operations of embodiments discussed herein. Each block may represent one or a combination of steps in a process. Although the flowcharts, block diagrams and schematics illustrate a specific order, it is understood that the order may differ from that which is depicted. For example, an order of processing of two or more blocks may be combined relative to the order shown. In addition, the vehicle assembly scheme 835 shown in FIG. 8, may be conducted concurrently, contemporaneously, or off-station. Further, in some embodiments, one or more of the blocks shown in FIGS. 4, and 8 may be skipped or omitted. In addition, any number of in-assembly process checks, dimensional verification, or documentation might be added to the methods described herein, for purposes of quality and functionality performance measurement. It is understood that all such variation is within the scope of the present disclosure.

Also, any standardized process controls discussed herein may be embodied as a production part approval process (e.g. PPAP) as a means to verify the reliability and repeatability of the individual manufacturing and assembly processes and is shown by way of example of the types of manufacturing and assembly process verification procedures used within the automotive industry. Other processes, procedures, and nomenclature to verify the reliability and repeatability of vehicle manufacturing and assembly production processes, including vehicle assembly build quality controls, may also be employed. Additionally, sub-assembly and module processes as noted herein may include error proofing controls, including without limitation, vision systems, tools calibration, and statistical process controls, among other techniques.

The unique vehicle identifier described herein can include, without limitation, for example a Vehicle Identification Number (VIN), a World Manufacturers Identifier (WMI), a Certificate of Motor Vehicle Compliance, and any other information, data, regulation and vehicle labelling required within the automotive industry.

It should be emphasized that the above-described embodiments of the present disclosure are merely possible examples of implementation set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A vehicle manufacturing, assembly and distribution system, comprising:
at least one computing device of a distribution point associated with a confirmed vehicle order for at least one vehicle assembly configured to:
instruct a first regional site to manufacture at least one primary vehicle structure associated with the confirmed vehicle order and deliver the at least one primary vehicle structure to an assembly point based on a vehicle order-to-delivery time and a geographic location of the assembly point specified by the confirmed vehicle order;
instruct a second regional site to manufacture at least one exterior and interior component associated with the confirmed vehicle order and deliver the at least one exterior and interior component to the assembly point based on the vehicle order-to-delivery time and the geographic location of the assembly point specified by the confirmed vehicle order;
instruct the assembly point comprising assembly stations and conveyors to assemble a vehicle associated with the confirmed vehicle order on a vehicle assembly line according to a vehicle manufacturing bill-of-material defining a vehicle assembly scheme for the at least one primary vehicle structure and the at least one exterior and interior component; and
arrange the assembly point to deliver the vehicle to the distribution point, wherein the vehicle is received at the distribution point after being assembled by the assembly point.

2. The system of claim 1, wherein the confirmed vehicle order for the at least one vehicle assembly identifying:
a geographic location of the first regional site for manufacturing the at least one primary vehicle structure associated with the at least one vehicle assembly;
a geographic location of the second regional site for manufacturing the at least one exterior and interior component associated with the at least one vehicle assembly; and
a geographic location of the distribution point for the distribution of the at least one vehicle assembly.

3. The system of claim 1, further comprising:
a plurality of assembly points located at different geographic locations;
a plurality of regional sites located at different geographic locations; and
a plurality of distribution points located in proximity to the assembly points.

4. A method, comprising:
instructing, by at least one computing device of at least one distribution point, a first regional site to manufacture at least one primary vehicle structure for at least one confirmed vehicle order and deliver the at least one primary vehicle structure to an assembly point based on a vehicle order-to-delivery time and a geographic location of the assembly point specified by the at least one confirmed vehicle order;

instructing, by the at least one computing device, a second regional site to manufacture at least one exterior and interior component for the at least one confirmed vehicle order and deliver the at least one exterior and interior component to the assembly point based on the vehicle order-to-delivery time and the geographic location of the assembly point specified by the at least one confirmed vehicle order;

instructing, by the at least one computing device, the assembly point comprising assembly stations and conveyors to assemble a vehicle for the at least one confirmed vehicle order based on a vehicle manufacturing bill-of-material defining a vehicle assembly scheme for the at least one primary vehicle structure and the at least one exterior and interior component;

arranging, by the at least one computing device, the assembly point to deliver the vehicle to the distribution point; and receiving, by the at least one distribution point, the vehicle after being assembled by the assembly point.

5. The method of claim 4, wherein the vehicle manufacturing bill-of-material further comprises:

identifying a manufacturing process for the at least one primary vehicle structure and the manufacturing and assembly process of individual parts of the primary vehicle structure for the at least one confirmed vehicle order; and individual parts of the at least one exterior and interior component, and the manufacturing and assembly process of the individual parts of the exterior and interior component for the at least one confirmed vehicle order.

6. The method of claim 4, wherein the vehicle assembly scheme for the at least one confirmed vehicle order further defines:

assembly instructions for the at least one vehicle;

the primary vehicle structure for the at least one vehicle; and the exterior and interior component for the at least one vehicle.

7. The method of claim 4, further comprising:

assigning, by the at least one computing device, a vehicle identification number for the at least one confirmed vehicle order.

8. The method of claim 4, further comprising: arranging, by the at least one computing device, a subset of a plurality of confirmed vehicle orders into a group of orders based on a type of vehicle specified in the subset of the plurality of confirmed vehicle orders, wherein the arranging comprises:

consolidating the group of orders among each other based in part on order-delivery times; and coordinating delivery of the group of orders to the assembly point based in part on order-to-delivery times.

* * * * *